J. A. JOHNSTON.

APPARATUS FOR AND METHOD OF MAKING ROADS.

APPLICATION FILED MAR. 22, 1917.

Reissued Jan. 14, 1919. 14,587.

Inventor
Jam A Johnston
by Attorney
Smith & Smith

UNITED STATES PATENT OFFICE.

JOHN A. JOHNSTON, OF SPRINGFIELD, MASSACHUSETTS.

APPARATUS FOR AND METHOD OF MAKING ROADS.

14,587. Specification of Reissued Letters Patent. Reissued Jan. 14, 1919.

Original No. 1,158,503, dated November 2, 1915, Serial No. 829,148, filed April 2, 1914. Application for reissue filed March 22, 1917. Serial No. 156,768.

*To all whom it may concern:*

Be it known that I, JOHN A. JOHNSTON, a citizen of the United States, residing at Springfield, in the county of Hampden and State of Massachusetts, have invented a new and useful Apparatus for and Methods of Making Roads, of which the following is a specification.

The principal objects of this invention are to provide for making a road with an even and uniform wearing layer; and to provide an improved apparatus for accomplishing this result.

Reference is to be had to the accompanying drawings in which—

Figure 1:
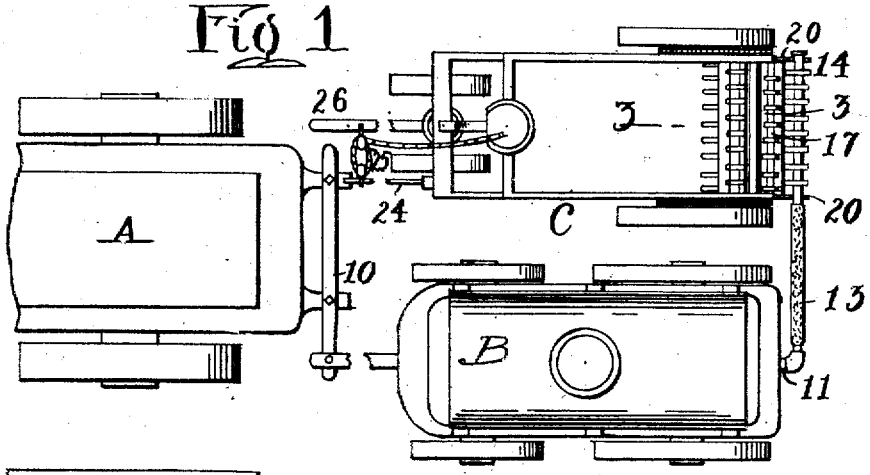
Figure 1 is a plan of an apparatus for carrying out this invention.
Figure 2:
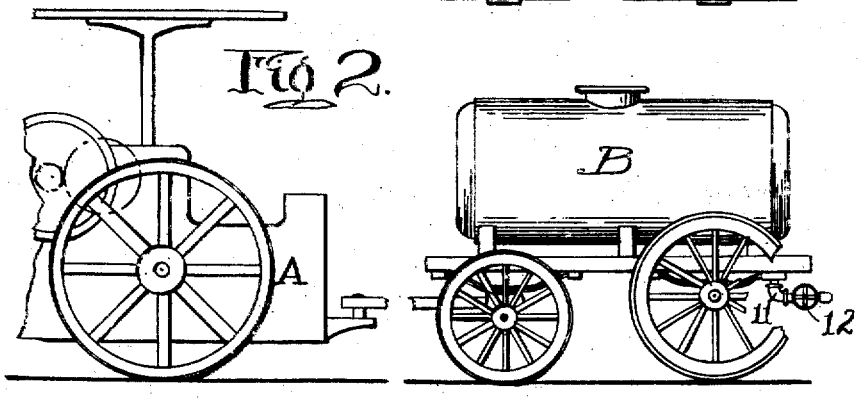
Fig. 2 is a side elevation thereof.
Figure 3:
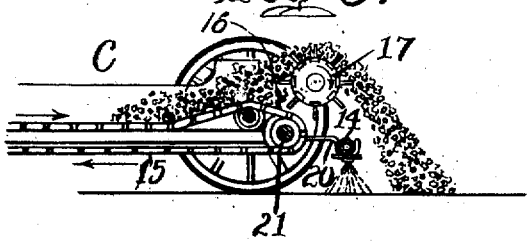
Fig. 3 is a longitudinal sectional view of a part of the same on the line 3—3 of Fig. 1.

There are two general processes of distributing a layer of combined bitumen and sand or small stones to furnish a wearing surface to a road bed. In the penetration method the fine stone is placed first on the road bed and the bitumen poured over it. Inequalities in the sizes of the stone fragments result in irregularity in the voids between the stone and cause an unequal penetration of the matrix. As it is impracticable to cover the bitumen immediately it cannot be rolled until it is so cool that it is no longer molten and there must be necessarily a lack of homogeneity. On account of the inequality of the voids, part of the bitumen, namely, that lying in the large voids, may be much softer than that in the small voids when the rolling takes place. This adds to this difficulty and the surface of such a road, therefore, is relatively uneven and bunchy. Parts of it contain more bitumen than other parts and it necessarily wears unevenly. The other method referred to is the so-called mixing method where the matrix and aggregate materials are mixed by hand or mechanical means before placing on the road. In this case the mixture is distributed by hand. Therefore each shovelful is a separate mass and the most extreme care is necessary to rake over these separated masses to prevent making bunches. In addition to this an appreciable amount of time elapses before the roller can pass over this mass for pressing and the bitumen is therefore so cool that the mixture cannot be thoroughly compacted.

This invention is designed for the purpose of distributing the molten bitumen evenly and under heavy pressure so as to insure uniform penetration of every crack and cranny of the surface over which it is spread and to apply it to a uniform surface so that it will be uniformly spread upon it. In this way the greatest possible adhesion to that surface is secured. Furthermore, the bituminous matrix thus spread is covered instantaneously, while still in a thoroughly molten condition with an aggregate of stone or sand. This is distributed by mechanical appliances in an absolutely uniform manner. In this way both the matrix and the aggregate can be left finally in absolutely uniform layers and as no bitumen is left uncovered a roller can follow it immediately and force the aggregate material into the bitumen while the latter is still molten thus insuring thorough adhesion of the matrix to the aggregate and foundation, giving therefore a homogeneous and uniform wearing surface.

These results are extremely important in practice and by this invention they are secured in an extremely simple manner which does not add to the cost of applying the layer but in fact decreases it.

The method of application is illustrated as being carried out by certain mechanism, some of which is well known in the art. First, an ordinary steam road roller or other vehicle A is shown constituting the motive power for drawing the rest of the apparatus. On the rear this carries a cross bar 10 behind which trail respectively a tank wagon B and a spreader C alongside each other. This tank wagon is of ordinary construction and need not be described in detail but is provided with a discharge pipe 11 at the rear connected through the valve 12 with a flexible hose 13. This hose is connected with a distributing pipe 14 carried by the spreader C. This spreader is shown as comprising mechanism substantially the same as that used in a well known type of manure spreaders, that is, it is provided with a carrier 15 bringing the sand or fine stone aggregate over an inclined plane at 16 from which it is carried up around a spreading cylinder 17. This carries the aggregate material up and distributes it in a uniform layer or the road surface. It will be understood of course that this distribution can take place from the rear of the spreader or from any point at the bottom according to the type of spreader employed, the details of the spreading apparatus not being a part of this invention, but it always spreads the aggregate material behind the bitumen and consequently on the fresh surface thereof.

The pipe 14 is provided with a pair of hooks 20 which are hung over a shaft 21 on the spreader so that this pipe depends therefrom and is located in position in front of the continuous stream of aggregate material so that it will distribute a layer of molten bitumen directly in front of the same.

The tank wagon, being connected with the distributing pipe 14 by the flexible connection 13, need not be kept in a definite position behind the roller but it is desired to steer the spreader so that it may distribute its product along a definite path of the road surface. For this purpose an ordinary steering device shown in the form of a link 24 and fall and tackle 25 connected with the tongue 26 is shown. By this means the spreader can be kept in proper position on the roadway.

The operation of the apparatus will be understood readily. The continuous stream of molten bitumen delivered from the tank B preferably under pressure is controlled from the seat of the spreader C by a valve, as for example, the valve 12 operated by means not shown. This is allowed to operate when the spreader is in operation and it will be seen that the molten bitumen is applied to the road surface so as to penetrate into the top of it and leave a uniform layer. This is immediately followed by a layer of sand or small stones which completely cover the molten bitumen and leave a surface over which a road roller can pass immediately. By passing the roller over it the aggregate material is forced into the molten bitumen while the same is in its best condition for receiving it. Moreover, the bitumen has previously been forced into the surface of the road bed to the greatest extent possible by spraying.

In this way not only is a perfectly uniform surface secured but the adhesion of the bituminous layer both to the roadbed and to the aggregate material is insured without fail. There is no occasion for securing any uneven laying of either material and no chance for any permanent inequality of voids on the cooling of the different parts of the bitumen, but on the other hand the materials are in the first place laid in their final uniform condition and do not have to be spread out or evened up subsequently. This is a great advantage not only in the ease of laying but especially in the durability of the road bed itself, and the protection of the surface on which this wearing layer is placed.

With my method of making the road bed, it will be seen that a very essential feature is that I provide for immediately covering the liquid matrix material, the aggregate material being continuously applied to the liquid material as fast as it is spread upon the road bed surface, thereby not only avoiding all mucking up of the tools and vehicles as well as the feet of the workmen and draft animals, but also avoiding the objectionable hardening or setting of the molten material that always occurs when this type of road bed is made by the usual manual methods. In other words, an important feature of my invention is that at no time during the carrying out of my method is there anything more than a small area of the liquid matrix material exposed, and this exposure lasts such a short time (but a fraction of a second ordinarily) that it is entirely negligible. In this way, practically the entire roadway is left free to be used by the workmen and road-building vehicles as well as by passing vehicles, thereby rendering it unnecessary to entirely close the roadway to traffic, and also giving the workmen ample room for performing the various duties incident to work of this character. With no other method of building this type of road bed that I am aware of can the work be done so expeditiously and cleanly and with so little disturbance to traffic as with my method.

Another important advantage is that the aggregate-carrying vehicle may be detached from the plant and taken back to the stone or gravel pile for another load without putting the plant out of operation, since another vehicle may be kept at hand to replace the one sent back to the pile. It will therefore be seen that with several of these aggregate-carrying vehicles in use, the plant may be kept continuously in operation at a considerable distance from the stone pile. This is very important, since it is impracticable to carry in a single load any considerable quantity of aggregate material, while it is entirely possible to haul a tank vehicle of sufficient capacity to last a considerable time. To disconnect the aggregate vehicle it is simply necessary to lift the sprayer pipe off its supports on that vehicle and swing it upwardly or to one side out of the way and then disconnect the coupling rod 24 from the draft rigging of the plant.

Although I have illustrated and described a certain preferred machine which it is desired to use, I am aware of the fact that other devices or machines can be used in place of them and modifications in details of construction can be made without departing from the scope of the invention as expressed in the claims, therefore I do not wish to be limited in these respects, but what I do claim is:—

1. The method herein described of road building consisting in progressively and forcibly projecting upon and into the surface of the road bed a layer of liquid matrix material of a kind adapted to set or harden upon exposure and immediately and progressively so projecting particles of aggregate material uniformly and forcibly through the air as to separate the particles from each other in the air, and cause them to strike the road bed individually with force, and be distributed evenly deep enough to so completely cover the matrix material, as to form a substantial part of the body of the road bed, whereby the aggregate material is applied to the matrix material while the same is still in a liquid state and whereby also exposure of any considerable area of the matrix material for any appreciable length of time is avoided, and subsequently compacting the aggregate material into the matrix.

2. In a portable road building plant, the combination of a tank vehicle and an aggregate vehicle detachably connected together, said aggregate vehicle being provided with means for discharging the aggregate material at its rear end, a matrix-spraying pipe flexibly connected to the tank vehicle, and means for removably supporting said spraying pipe behind the aggregate vehicle and in front of the discharging stream of aggregate material, whereby the spraying pipe may be disconnected from the aggregate vehicle and swung aside and the aggregate vehicle detached, for the purpose set forth.

3. In an apparatus for applying a wearing surface to a road bed, the combination with a roller, of a tank car trailing behind the same, and a spreader trailing behind the roller alongside the tank car, said tank car being provided with an outlet pipe, said spreader being provided with a spraying pipe, a flexible connection between the outlet pipe of the tank car and said spraying-pipe, and means on said spreader for spreading sand or stone aggregate material on the road bed just at the rear of said spraying pipe.

4. In an apparatus for making roads, the combination with a propelling vehicle, of a tank car trailing behind the same, a spreader also trailing along behind the vehicle and alongside the tank car, a spraying pipe connected with the tank car, and means on said spreader for spreading aggregate material on the road bed just at the rear of said spraying pipe.

5. In a portable road building plant, a tank vehicle and an aggregate-carrying vehicle and means for detachably connecting them together so that they may travel as a pair or separately, a spray pipe attached to the tank vehicle and provided with a flexible connection, means for supporting said spray pipe at the rear of the aggregate vehicle, and means on the aggregate vehicle for carrying the aggregate material over the spray pipe and discharging it on the road bed at a point to the rear of the spray pipe.

6. The method herein described, consisting in progressively and so forcibly projecting upon a road bed a liquid matrix material of a kind adapted to set or harden upon exposure, that it will be driven into the voids of, and adhere to, the surface to be covered, so progressively projecting particles of aggregate material uniformly and forcibly through the air as to separate the particles from each other in the air, and cause them to strike the road bed individually with force, and be distributed evenly thereon, so that the matrix and aggregate materials will be brought into such intimate contact with each other while the former is in a liquid condition, that the separate particles of aggregate material will be embedded in the matrix material to constitute therewith a uniform layer, and rolling the mass before the matrix material hardens.

In testimony whereof I have hereunto affixed my signature.

JOHN A. JOHNSTON.